3,018,261
PROCESS FOR THE MANUFACTURE OF SHAPED BODIES
Adolf von Friedrich, Leverkusen-Bayerwerk, and Gottfried Scriba, Leverkusen, Germany, assignors to Farbenfabriken Bayer Aktiengesellschaft, Leverkusen, Germany, a corporation of Germany
No Drawing. Filed June 11, 1957, Ser. No. 664,915
3 Claims. (Cl. 260—23)

This invention relates to shaped bodies and to a process for their production.

Solid substances, such as dyestuffs, vulcanization accelerators, age-resistors, stabilizers, decomposing and filling agents, which are added to other compounds or mixtures of compounds which have for example to be distributed as uniformly as possible in plastic masses of high molecular weight, such as natural or artificial rubber, plastics and the like, must have a very small particle size. Such fine powders, however, have a number of disadvantages. Due to the fact that dust is developed very easily, there are not only losses of material, but often also serious inconvenience to the persons handling the materials, such that it is necessary to have particularly costly plant for dust extraction purposes. The low-flowing power of such powders makes it difficult to work from storage vessels and to control their supply. Moreover, many such substances have the property of acquiring a strong electrostatic discharge when the particles thereof are moved. When electric discharges take place, explosions can occur when mixtures of dust and air are present.

In order to avoid the disadvantages referred to, various proposals have already been made for converting such substances into the form of granules, tablets, balls, flakes and the like. The production of such shaped elements however, has disadvantages because when they are mixed with other compounds, e.g., when they are mixed into plastic masses, it is necessary for them to be completely broken down again into their original powdery form, and to be uniformly distributed in the plastic masses.

The shaping of such powders in the presence or absence of vaporisable liquids leads to the production of shaped elements which either have too low a strength factor, so that a more or less large proportion thereof is reduced to dust when the shaped articles are moved, or they are too solid and can no longer be distributed sufficiently finely in the plastic masses.

Consequently, for the production of shaped articles from powders etc., it has already been proposed to use various binding agents which hold the particles together and which are dissolved or concurrently distributed in the mixing operation with other compounds, e.g. in rubber or other plastic masses. In particular, the addition of natural or artificial rubber latex or other high polymer hydrocarbons of ethylene, propylene or butylene, and also copolymers of butadiene with monomers containing nitrile, ester and ether groups, has been proposed. Cellulose compounds and mixtures with fatty acids, for example stearic acid, have also been proposed.

These substances increasing the strength of the shaped elements are generally incorporated into aqueous suspensions or pastes of the substances to be shaped. This generally requires a complicated working of the substances to be incorporated so as to ensure that they are distributed uniformly. The use of natural or artificial rubber emulsions in particular presents difficulties, because the substances to be mixed very frequently precipitate the high polymers and thus uniform distribution is not possible or can only be carried out at considerable expense.

The incorporation of waxy substances of high molecular weight, such as fatty acids alone or in combination with water-insoluble neutral organic colloids, for example size, requires more time than higher temperatures when they are mixed into plastic masses, since the added waxy substances must melt first.

It has now been found that substances which are to be incorporated in powder form into plastic masses of high molecular weight may be converted into shaped articles such as granulates and the like if these substances are shaped in form of their powders or water-containing or alcohol-containing pastes in the presence of water-soluble high polymer compounds.

The products to be shaped are usually produced as aqueous or alcoholic pastes into which the water-soluble high polymer compounds according to the invention can be completely incorporated in a short time without any danger of precipitation or coagulation of said high molecular compounds. The products to be shaped therefore do not have to undergo a special washing or other cleansing processes before the mixing with the water-soluble polymers.

The water-soluble high-polymers used for the process according to the invention can be obtained by polymerization from the known monomeric vinyl compounds, for example from vinyl ester which can be transformed to the polyvinyl alcohols by a subsequent saponification, from vinyl ethers or acrylic or methacrylic acid or their water-soluble salts such as the ammonium or alkali metal salts, or their ester amides or their urea derivatives. Furthermore there can be used copolymers of these compounds and copolymers with additional maleic or fumaric acid anhydrides or their water-soluble semi-esters. It is also possible to employ copolymers of these monomers with water-insoluble vinyl compounds (for example styrene, acrylic or methacrylic esters or acrylonitrile), the amount of these products being of course limited by the water-solubility which is required of the resultant copolymer. Thereby it is advisable that the resultant high polymers have a water solubility of at least 1%. The polymerization of these products can be carried out in aqueous solution by conventional methods, and the following compounds, for example, can serve as radical formers: persulfates, hydroperoxides, peroxides, and azo-isobutyric acid nitrile. In order to produce high polymer solutions with a particularly high binding power, it is advisable that polymerization should be carried out at lowest possible temperatures with redox activation. Preferably the high polymers obtained shall have a molecular weight of about 1,000–500,000, compounds having a molecular weight of about 10,000–100,000 being preferably used. Mixtures of said high polymers can be used as well.

The shaping of the products used according to the invention can be effected by known methods, for example by forcing the mixed compounds through screening fabrics or perforated plates or by pressing by means of spindles through perforated plates. The products thus shaped are then subjected to a conventional drying process.

The quantity of water-soluble high polymers which are added can fluctuate within wide limits and is determined by the standards which are required as regards solidity of the granulates produced in this way. Generally speaking, additions in the range from 0.5 to 20%, preferably 1–10% based on the compounds to be shaped have proved satisfactory, although smaller additions of for example 0.1% can often result in a degree of shaping stability and resistance to rubbing, since the added high polymer substances partially migrate with the water to the surface of the shaped elements during the subsequent drying process, so that a concentration is provided on the said surface. This provides particular protection against rubbing and increases the stability of shape. Since this layer can be kept very thin, shaped elements manufactured in this manner are completely broken up into the original granular form by the pressures set up when they are incorporated into rubber and plastic mixtures, very good distribution of the compounds which are to be incorporated being guaranteed.

In a preferred embodiment of the invention there are added adidtionally mineral or vegetable oils such as paraffin oil, spindle oil, castor oil, cotton seed oil, rapeseed oil to the mixture of compounds to be shaped preferably to the aqueous solution of the water soluble high polymers. If necessary, there can be added furthermore an emulsifier.

The following examples further illustrate the invention without limiting it thereto.

Example 1

7 parts by weight of a 10% solution of ammonium polyacrylate (molecular weight 20,000) are added to 100 parts by weight of a moist paste of di-(mercapto-benzthiazyl)-disulfide with a water content of about 30%. The mass is stirred to effect mixing, shaped in known manner by being brushed for example through a perforated plate, and the elements which are formed are dried at 80° C.

Instead of the above high polymer there can be used as well a polymer having a molecular weight of about 50,000 or 100,000.

Example 2

A copolymer was prepared by reacting 30 parts by weight of styrene and 70 parts by weight of maleic acid anhydride in 800 parts by weight of benzene at 70° C. for 4 hours in the presence of 0.7 part by weight of benzoyl peroxide. The reaction product obtained is treated with 500 parts by weight of an aqueous 4% solution of sodium hydroxide for 12 hours. Thus, a highly viscous aqueous solution is obtained. For shaping mercaptobenzthiazole cyclohexyl sulfenamide, the aqueous moist product is mixed with 10% of the copolymer described above, this amount being calculated on the dry weight of the mercaptobenzthiazole cyclohexyl sulfenamide. After shaping, the product is dried at 50° C. and solid elements which readily break up on being incorporated into rubber and are distributed satisfactorily therein, are obtained.

Example 3

Granulates of mercapto-benzimidazole which maintain their shape and can be stored are obtained if 3% of a solution of polyvinyl alcohol (molecular weight about 50,000) in water is added to the aqueous moist product, this percentage being calculated on anhydrous mercaptobenzimidazole, and the product is shaped in known manner and dried at 120° C.

Example 4

40 parts by weight of a 10% aqueous solution of polyacrylic acid amide (molecular weight about 30,000) are added to 200 parts by weight of an 80% mixture of mercapto benzthiazole with water, such as the mixture formed in the manufacture of this product by separation with a filter from an aqueous paste, and the two components are mixed. Shaped articles are then made in known manner from the mass which is thus obtained.

Instead of the above polymer a polyacrylic acid amide having a molecular weight of about 80,000 can be used.

Example 5

115 parts by weight of an aqueous paste of tetramethylthiuramdisulfide having a water content of 18% are mixed with 27.7 parts by weight of an emulsion consisting of 200 parts by weight of polyacrylic acid amide (molecular weight about 5,000), 600 parts by weight of the ammonium salt of polyacrylic acid (molecular weight about 200,000), 20 parts by weight of an alkyl sulfonate ($C_{12}$–$C_{18}$) and 100 parts by weight of paraffin oil or castor oil. This mixture is then pressed through a perforated plate and the shaped articles obtained are dried.

Example 6

10 parts by weight of methacrylic acid dissolved in 90 parts of water are polymerized in aqueous medium by adding 0.05 part by weight of formamidine sulfinic acid and 0.05 part by weight of potassium persulfate at a temperature of 30° C. After the main reaction has finished the mixture is stirred for 6 hours at 30° C. and the polymethacrylic acid obtained having an average molecular weight of 60,000 is neutralized with aqueous ammonia.

60 parts by weight of the polymethacrylic acid solution thus obtained are mixed with 110 parts by weight of a grained diphenyl guanidine. From this mixture shaped articles are obtained by brushing the mixture through a perforated plate and drying the articles obtained at a temperature of 90° C.

Example 7

If in Example 6 the methacrylic acid is substituted by 8.5 parts by weight of acrylic acid and 1.5 parts by weight of acrylic acid methyl ester a water soluble copolymerisate is obtained having an average molecular weight of about 80,000. The free carboxylic acid groups of this copolymerisate are neutralized by aqueous sodium hydroxide solution.

100 parts by weight of this solution are mixed with 90 parts by weight of finely divided silicium dioxide and shaped articles are then obtained by brushing this mixture through a perforated plate and drying the articles at a temperature of 100° C. These solid articles thus obtained break up readily if they are subjected to a slight pressure.

Instead of the above silicium dioxide there can be used as well carbon black, zinc oxide, calcium carbonate or inorganic or organic dyestuffs or phthalic acid anhydride, benzoic acid, benzene sulfohydrazide or the zinc salt of pentachlorothio phenol.

Example 8

7 parts by weight of acrylic acid amide and 3 parts by weight of methacrylic acid ureide are polymerized in 80 parts of water at 35° C. with a redox system consisting of 0.02 part by weight of sodium dithionite and 0.02 part by weight of ammonium persulfate. The mixture is then stirred for another 5 hours and a viscous aqueous solution of the copolymerisate is obtained having an average molecular weight of about 90,000.

In an analogous manner a copolymerisate can be obtained by using instead of the above acrylic acid amide and methacrylic acid ureide 9 parts by weight of acrylic acid amide and 1 part of an ester amide of the compound of the formula $$CH_2=C-CONH-CH_2-CH_2-OOC.CH_3$$
$$|$$
$$R$$

wherein R stands for hydrogen or a methyl group.

5 parts by weight of this solution are added to 120 parts by weight of an aqueous paste of the nickel salt of diethyl-dithiocarbamic acid having a water content of 31%. If this mixture is brushed through a perforated plate and then dried at 80° C. a solid granulate is obtained.

Example 9

9 parts by weight of acrylic acid or methacrylic acid are copolymerised with 1 part by weight of maleic or fumaric acid or their monomethyl ester in 90 parts of water and in the presence of 0.05 part by weight of sodium pyrosulfite and 0.02 part of potassium persulfate at a temperature of 40° C. Thus, copolymerisates are obtained having an average molecular weight of about 40,000–70,000. The free carboxylic acid groups of these compounds are then neutralised with ammonia.

An emulsion is prepared by mixing 100 parts by weight of the solution thus obtained with 5 parts of an alkyl sulfonate and 15 parts by weight of a mineral oil having a flash point above 100° C. 20 parts by weight of this emulsion are mixed with 115 parts by weight of an aqueous paste of diphenyl thiourea having a water content of 20 parts. Shaped articles are prepared from this mixture by brushing the mixture through a perforated plate and drying the articles obtained at 100° C.

*Example 10*

9 parts by weight of acrylic acid amide and 1 part of acrylic acid nitrile are dissolved in 90 parts of water and polymerized at 70° C. by adding 1 part by weight of azo-diisobutyric acid nitrile. The water soluble copolymerisate obtained has an average molecular weight of about 60,000.

20 parts by weight of the solution thus obtained are mixed with 128 parts by weight of a methanolic paste of tetramethyl-thiuram-monosulfide having a methanol content of 30 parts by weight. This mixture is brushed through a perforated plate and dried at 70° C. Thus, shaped articles are obtained which break up if subjected to a slight pressure and which have an excellent stability of shape against rubbing.

We claim:

1. In a process wherein an additive in the form of a finely divided powder is to be uniformly distributed throughout a high molecular weight plastic to improve the physical properties thereof, and wherein said finely divided additive is converted into larger aggregates in order to facilitate its storage and handling before use, said agglomerates being formed by mixing a binder with the finely divided powder and extruding the resulting paste through an orifice to form granules which are then dried, the improvement comprising employing as the binder an aqueous solution of polyacrylic acid amide, the latter being at least 1% water-soluble and having a molecular weight of 1,000 to 500,000, the resulting dried granules being stable and resistant to rubbing but having the property of breaking down into the original powdery form by the pressure employed in mixing the granules with the high molecular weight plastic, the proportion of the polyacrylic acid amide to the powder being 0.1–20% by weight based on the powder.

2. In a process wherein an additive in the form of a finely divided powder is to be uniformly distributed throughout a high molecular weight plastic to improve the physical properties thereof, and wherein said finely divided additive is converted into larger aggregates in order to facilitate its storage and handling before use, said agglomerates being formed by mixing a binder with the finely divided powder and extruding the resulting paste through an orifice to form granules which are then dried, the improvement comprising employing as the binder an aqueous solution of ammonium polyacrylate, the latter being at least 1% water-soluble and having a molecular weight of 1,000 to 500,000, the resulting dried granules being stable and resistant to rubbing but having the property of breaking down into the original powdery form by the pressure employed in mixing the granules with the high molecular weight plastic, the proportion of the ammonium polyacrylate to the powder being 0.1–20% by weight based on the powder.

3. In a process wherein an additive in the form of a finely divided powder is to be uniformly distributed throughout a high molecular weight plastic to improve the physical properties thereof, and wherein said finely divided additive is converted into larger aggregates in order to facilitate its storage and handling before use, said agglomerates being formed by mixing a bnder with the finely divided powder and extruding the resulting paste through an orifice to form granules which are then dried, the improvement comprising employing as the binder an aqueous solution of polymethacrylic acid, the latter being at least 1% water-soluble and having a molecular weight of 1,000 to 500,000, the resulting dried granules being stable and resistant to rubbing but having the property of breaking down into the original powdery form by the pressure employed in mixing the granules with the high molecular weight plastic, the proportion of the polymethacrylic acid to the powder being 0.1–20% by weight based on the powder.

References Cited in the file of this patent

UNITED STATES PATENTS

| | | |
|---|---|---|
| 1,997,489 | Herrmann et al. | Apr. 9, 1935 |
| 2,495,277 | Navikas | Jan. 24, 1950 |
| 2,538,809 | TeGrotenhuis | Jan. 23, 1951 |
| 2,548,332 | Alexander et al. | Apr. 10, 1951 |
| 2,555,050 | Lyne et al. | May 29, 1951 |
| 2,555,468 | Bogin et al. | June 5, 1951 |
| 2,568,426 | Whetstone et al. | Sept. 18, 1951 |
| 2,640,088 | Glenn et al. | May 26, 1953 |
| 2,663,989 | Schlatter et al. | Dec. 29, 1953 |
| 2,692,245 | Groves et al. | Oct. 19, 1954 |
| 2,798,106 | Hill et al. | July 2, 1957 |
| 2,850,553 | Roberts | Sept. 2, 1958 |
| 2,888,443 | Hayes et al. | May 26, 1959 |

OTHER REFERENCES

Amon: Rubber Manufacture, p. 343, vol. 640, Nov. 11, 1950.